US012724165B2

(12) United States Patent
Keskes

(10) Patent No.: US 12,724,165 B2
(45) Date of Patent: Sep. 1, 2026

(54) METHOD OF AND APPARATUS FOR DETERMINING A MULTIPLE WELL SEISMIC-TO-WELL TIE

(71) Applicant: TotalEnergies OneTech, Courbevoie (FR)

(72) Inventor: Noomane Keskes, Pau (FR)

(73) Assignee: TOTALENERGIES ONETECH, Courbevoie (FR)

( * ) Notice: Subject to any disclaimer, the term of this patent is extended or adjusted under 35 U.S.C. 154(b) by 522 days.

(21) Appl. No.: 18/268,976

(22) PCT Filed: Jan. 21, 2021

(86) PCT No.: PCT/EP2021/051375

§ 371 (c)(1),
(2) Date: Jun. 21, 2023

(87) PCT Pub. No.: WO2022/156900

PCT Pub. Date: Jul. 28, 2022

(65) Prior Publication Data

US 2024/0045094 A1 Feb. 8, 2024

(51) Int. Cl.
*G01V 1/50* (2006.01)
*G01V 1/30* (2006.01)
(Continued)

(52) U.S. Cl.
CPC .................. *G01V 1/50* (2013.01); *G01V 1/30* (2013.01); *G01V 1/307* (2013.01); *G06N 3/0464* (2023.01); *G06N 3/08* (2013.01); *G06V 10/82* (2022.01)

(58) Field of Classification Search
USPC .............................................................. 702/6
See application file for complete search history.

(56) References Cited

U.S. PATENT DOCUMENTS

2008/0071709 A1* 3/2008 Strack .................... G01V 3/083 706/20
2013/0338986 A1 12/2013 Nyrnes et al.
(Continued)

FOREIGN PATENT DOCUMENTS

WO WO-2015067864 A1 5/2015
WO 2016115437 A1 7/2016

OTHER PUBLICATIONS

Veeken, et al.; Nonlinear Multitrace Genetic Inversion Applied on Seismic Data Across the Shtokman Field, Offshore Northern Russia; Geophysics, Nov. 1, 2009, vol. 74, No. 6, pp. WCD49-WCD59.
(Continued)

*Primary Examiner* — Paul D Lee
(74) *Attorney, Agent, or Firm* — Alleman Hall LLP

(57) ABSTRACT

Disclosed is a method for determining a seismic-to-well tie for a plurality of wells comprised within a reservoir zone. The method comprises generating a first candidate population of well locations for each of said plurality of wells and using a trained neural network to invert seismic data relating to said reservoir zone in accordance with said candidate population of well locations, to obtain inversion well data. The inversion well data is evaluated by comparing said inversion well data to validation well data relating to the reservoir zone. An evolutionary algorithm is applied to said candidate population of well locations to obtain an updated candidate population of well locations. A further training said trained neural network is performed in accordance with said updated candidate population of well locations, and the steps iteratively repeated until at least one stopping criterion is reached.

24 Claims, 7 Drawing Sheets

(51) Int. Cl.

| | |
|---|---|
| *G06N 3/0464* | (2023.01) |
| *G06N 3/08* | (2023.01) |
| *G06V 10/82* | (2022.01) |

(56) References Cited

U.S. PATENT DOCUMENTS

| | | | | |
|---|---|---|---|---|
| 2020/0309979 | A1* | 10/2020 | Wang | G01V 20/00 |
| 2021/0089897 | A1* | 3/2021 | Zhang | G06N 3/084 |
| 2021/0181362 | A1* | 6/2021 | Jiang | G06N 3/08 |
| 2021/0311221 | A1* | 10/2021 | Roy | G01V 1/48 |
| 2022/0206177 | A1* | 6/2022 | Saikia | G06N 5/04 |

OTHER PUBLICATIONS

Al-Rahim et al.; 3D Seismic Genetic Inversion for Reservoir Characterization and Prospects Identification; International Journal of Science and Research (IJSR), Oct. 2017, vol. 6, No. 10, pp. 488-493.

Shi et al.; Finding an Optimal Well-Log Correlation Sequence Using Coherence-Weighted Graphs; SEG Technical Program Expanded Abstracts, Society of Exploration Geophysicists, Aug. 17, 2017, pp. 1982-1987.

"International Search Report"; prepared for PCT/EP2021/051375; Authorized Officer Olinka Mirkovic; Oct. 6, 2021; 4 pages.

"Written Opinion"; prepared for PCT/EP2021/051375; Authorized Officer Olinka Mirkovic; Oct. 6, 2021; 5 pages.

Sukkee Nisa et al; "Application of Machine Learning to Estimate Sonic Data for Seismic Well Ties, Bongkot Field, Thailand"; Abu Dhabi International Petroleum Exhibition & Conference; Nov. 11, 2019; Retrieved from the Internet: URL:https://watermark.silverchair.com/spe-197822-ms.pdf?token=AOECAHi208BE49Ooan9kkhW_Ercy7Dm3ZL_9Cf3qfKAc485ysgAAAvowggL2BgkqhkiG9w0BBwagggLnMIIC4wIBADCCAtwGCSqGSlb3DQEHATAeBglghkgBZQMEAS4wEQQMx8GwGOUICZ1 HexXgAgEQglICrTkFlqhljbm5J3jhIPM8UsluixWysek7FVFjESOWT Js5h3mx7rmb5tVvWebFpAVchCGFgCLEB4bTRDIbev7BeZ.

Dorrington Kevin P. et al; "Genetic-algorithm/neural-network approach to seismic attribute selection for well-log prediction"; Geophysics, vol. 69, No. 1; Jan. 31, 2004; pp. 212-221.

* cited by examiner

METHOD OF AND APPARATUS FOR DETERMINING A MULTIPLE WELL SEISMIC-TO-WELL TIE

FIELD OF THE INVENTION

The present invention relates to the processing of seismic signals and notably the field of the interpretation of seismic waves for the precise construction of images, notably for carbonated subsoils and for the detailed characterisation of reservoirs.

BACKGROUND OF THE INVENTION

When conducting seismic studies, the propagation rate of the seismic wavelet emitted is an important piece of data for the precise determination of a seismic image. Generally, a high propagation rate tends to reduce the vertical resolution of the image constructed using conventional seismic imaging tools.

In particular, calculation uncertainties may be such in defined rate models that a slight error in the time domain may give rise to significant variations in the spatial domain. This problem is increased if the seismic wavelet is propagated at a high rate in the subsoil under study (in particular, if the subsoil comprises carbonates, as in some reservoirs in the Middle East).

Vertical reservoir resolution is however useful for industrial firms seeking to operate these reservoirs. This resolution particularly enables:

- superior estimation of the volumes of hydrocarbons or gas present in the subsoil;
- superior modelling of the reservoirs for subsequent simulations (e.g. geo-modelling);
- superior monitoring of drilling operations;
- etc.

To address this, a method has been described in patent application WO2015/067864 (incorporated herein by reference), which enables processing of seismic signals in an enhanced way so as to increase seismic image resolution.

However, for the methods disclosed in WO2015/067864, the relationship between the location of the well and the seismic data is not known accurately. It would therefore be desirable to better relate the well location to the seismic data.

SUMMARY OF THE INVENTION

For this purpose, the present invention proposes to enhance the processing of seismic signals in order to extract a maximum amount of information therefrom, and notably enhance the definition of the seismic images generated.

The present invention thus relates to a method for determining a seismic-to-well tie for a plurality of wells comprised within a reservoir zone; the method comprising:

a) obtaining a trained neural network, having been trained to infer well data from seismic data for said reservoir zone;

b) generating a first candidate population of well locations for each of said plurality of wells;

c) using said trained neural network to invert seismic data relating to said reservoir zone in accordance with said candidate population of well locations, to obtain inversion well data;

d) evaluating said inversion well data by comparing said inversion well data to validation well data relating to the reservoir zone;

e) applying an evolutionary algorithm to said candidate population of well locations to obtain an updated candidate population of well locations;

f) further training said trained neural network in accordance with said updated candidate population of well locations; and g) iteratively repeating steps c) to f) until at least one stopping criterion is reached.

A computer program, using all or part of the method described above, installed on pre-existing equipment, is advantageous per se, insofar as it makes it possible to process a seismic signal effectively.

As such, the present invention also relates to a computer program containing instructions for the use of the method described above, when this program is executed by a processor.

This program can use any programming language (for example, an object or other language), and be in the form of an interpretable source code, a partially compiled code or a fully compiled code.

Further features and advantages of the invention will emerge further on reading the following description.

BRIEF DESCRIPTION OF THE FIGURES

Embodiments of the invention will now be described, by way of example only, by reference to the accompanying drawings, in which.

DETAILED DESCRIPTION OF THE INVENTION

Figure 1:
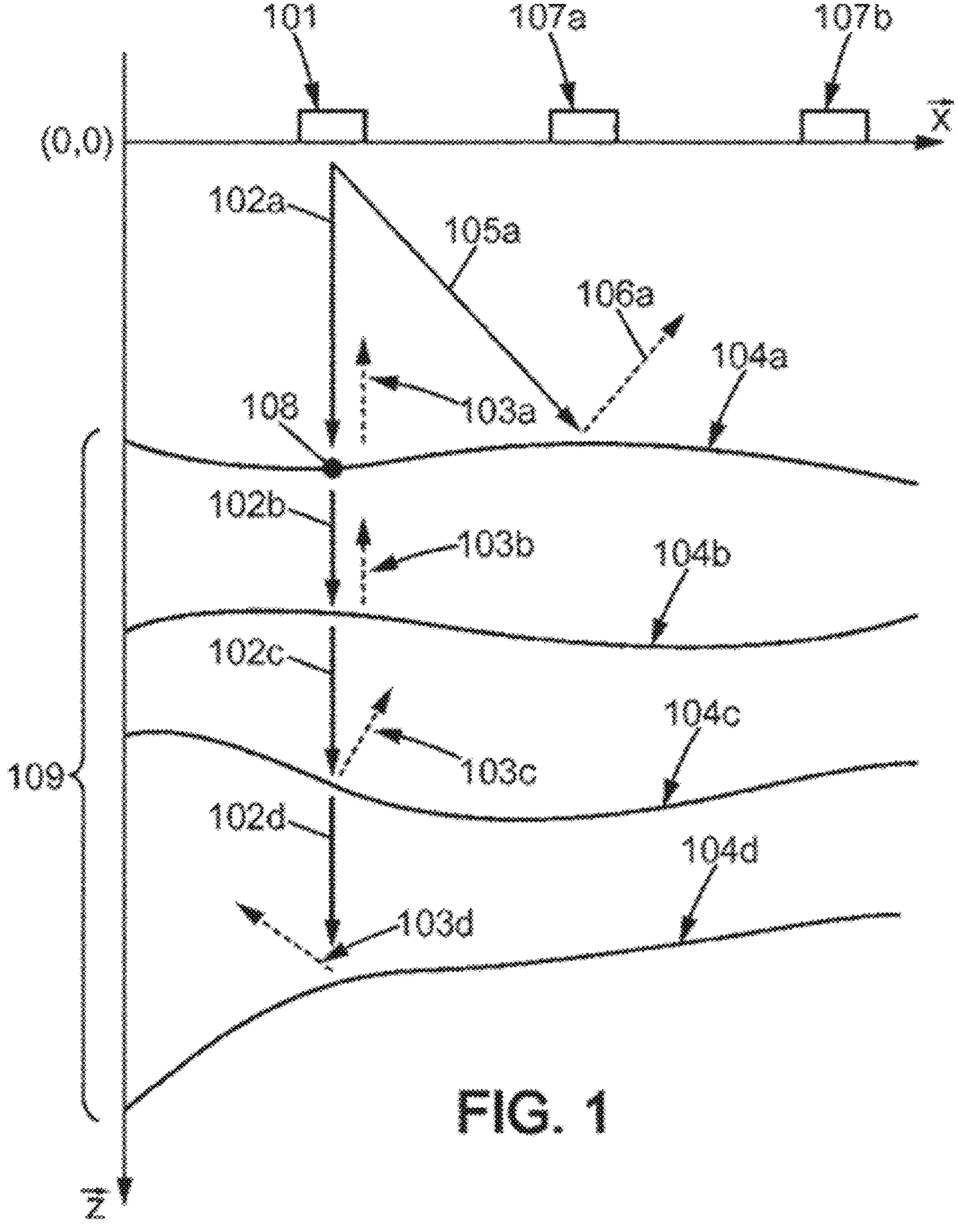
FIG. 1 illustrates an illustration of seismic reflections in a particular embodiment.

FIG. 1 illustrates an illustration of seismic reflections in a particular embodiment. Following the emission of a seismic wavelet in the subsoil, by a seismic vibrator truck 101 for example, this wavelet is propagated in the subsoil vertically (arrow 102 *a*, 102 *b*, 102 *c*, 102 *d*) but also in all spatial directions (arrow 105 *a*).

The term "seismic wavelet" denotes the seismic pulse or elementary wavetrains emitted by the vibration source (e.g. vibrator truck). This wavelet is reflected by the interfaces (104 *a*, 104 *b*, 104 *c*, 104 *d*) for the change of propagation index in the subsoil: the reflected wave (103 *a*, 103 *b*, 103 *c*, 103 *d*, 106 *a*) is propagated in a direction symmetric to the direction of incidence with respect to a normal to the interface at the incidence zone. For example, if the interface

104 a is perpendicular to the wave 102 *a* at the point 108, then the reflected wave 103 *a* will be in the same direction as the incident wave 102 *a* (but in the opposite direction).

In order to capture the waves reflected in varied directions, it is possible to place different geophones 107 *a* or 107 *b* at different distances (or offsets) from the seismic truck 101. As such, the reflected wave 106 *a* can be captured by the geophone 107 *b*.

There are numerous methods for determining, on the basis of the geophone records, the trajectory of the wavelets (e.g. seismic migration). These methods generally supply seismic images based on "pre-stack" signals or on "stack" signals. During the reception of the seismic signal, a portion of the signal arriving after another portion of the signal is generally representative of a reflection located more in-depth. As such, it is possible, with the knowledge of the values of a reservoir 109 in the subsoil, to process a signal received by the different geophones so as to retrieve a filtered/processed signal therefrom, only containing information relating to the reflections occurring within this reservoir (i.e. temporal definition of the signal received).

Figures 2A, 2B:
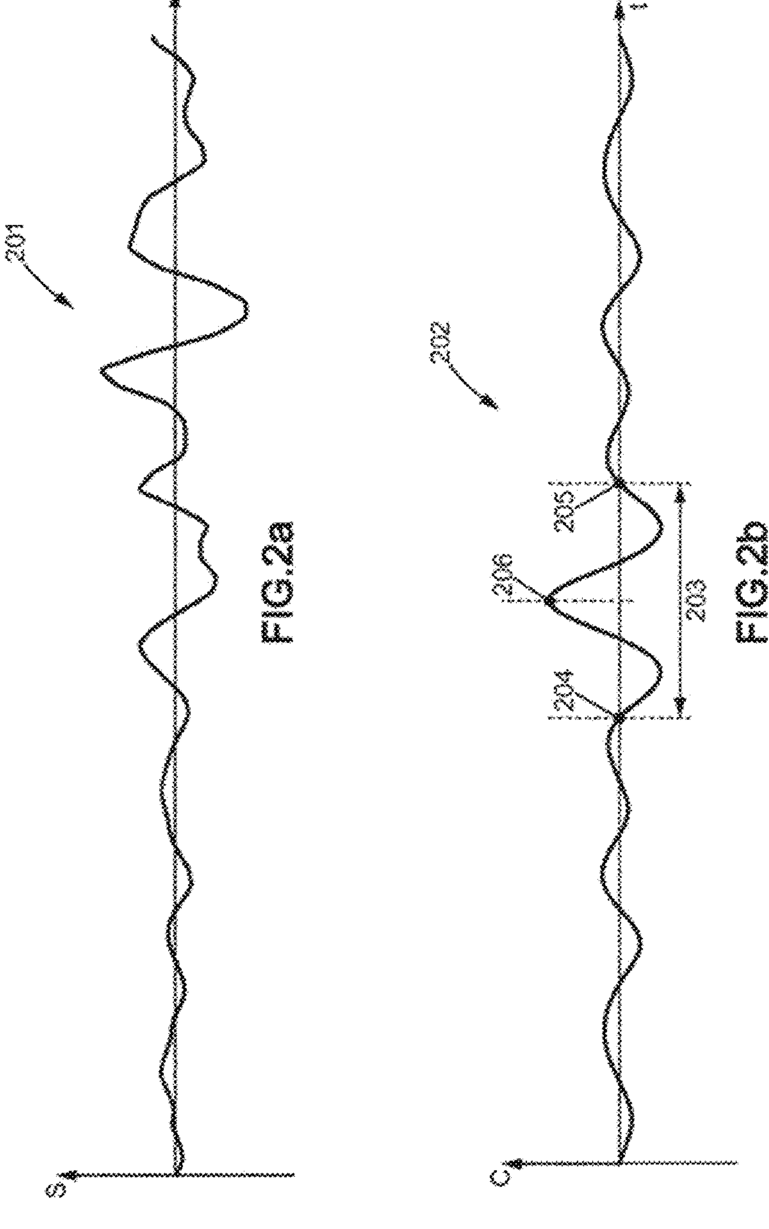
FIG. 2*a* illustrates an example of a seismic signal received in response to the emission of a seismic wavelet in a reservoir and in one embodiment of the invention.
FIG. 2*b* illustrates an example of autocorrelation of the signal in FIG. 2*a* in one embodiment according to the invention.

FIG. 2*a* illustrates an example of a seismic signal received in response to the emission of a seismic wavelet in a reservoir. The seismic signal received (optionally after temporal definition as mentioned above) can be represented by the graph 201. The axis t is herein a time axis expressed in seconds, fractions of seconds or in number of samples (the signal being in this case sampled according to a predetermined frequency). The axis S is representative, for example, of a power or an amplitude of the acoustic signal received. Obviously, it is difficult, on the basis of this signal, to determine the shape or length of the wavelet emitted. For this purpose, it is possible to carry out de-convolution of the signal received on the assumption that an interface of the subsoil can be represented by a pulse response optionally including a reflectivity model and/or an attenuation model. This method is relatively complex to implement and implies good knowledge of the temporal position of the interfaces. Furthermore, this de-convolution is generally incomplete and a signal containing high-frequency information (e.g. greater than 100 Hz) may remain. This residual signal is generally considered, by the prior art, as a noise.

FIG. 2*b* illustrates an example of autocorrelation of the signal in FIG. 2*a*. Indeed, it is possible to determine an estimation of the length of the wavelet emitted without having to compute complex de-convolutions. It is possible to compute the autocorrelation of the signal received after temporal definition thereof in a time window corresponding to the reservoir. An autocorrelation is a correlation of a signal by itself, this second signal being offset by a given time interval. The autocorrelation of the signal 201 is the curve 202. The X-axis of this curve represents the time interval between the two correlated identical signals and the Y-axis shows the correlation of these two curves for the time interval in question.

In FIG. 2*b*, the correlation of the two signals is sometimes high, sometimes low. The repetition (or "respiration") of this correlation thus makes it possible to determine a representative correlation distance of the length of the wavelet having generated this signal. This correlation distance 203 is the distance between the two symmetric zeros (204, 205) with respect to the maximum peak 206. If a plurality of distances are used to compute the length of the wavelet (e.g. for a plurality of seismic traces), it is possible to determine a variance of this distance in order to determine the precision of this determination.

Figure 3A:
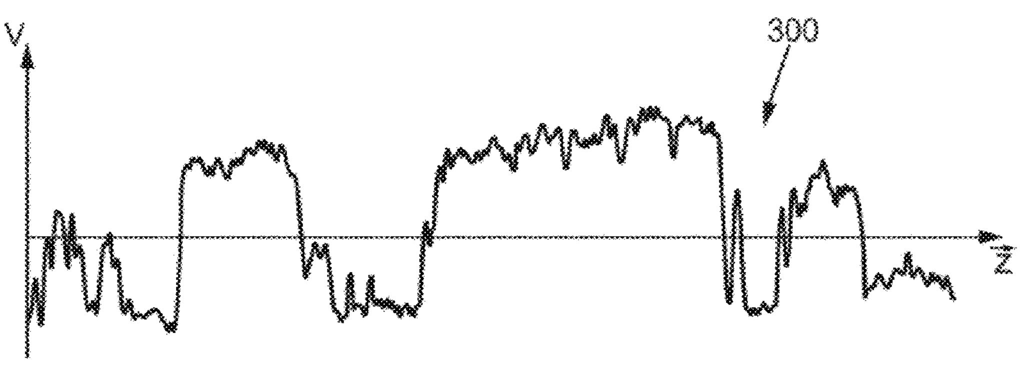
FIG. 3*a* illustrates an example of well data in one embodiment according to the invention.

FIG. 3*a* illustrates an example of well data. The term "well data" denotes geological, geophysical or other data, obtained, for example, from drill holes. They are, for example, one or a plurality of pieces of information located along the well relating to one or more of: the facies of the subsoil; rock reflectivity; rock porosity; rock resistivity; rock elasticity; rock permeability; etc. When the well data only contain a single piece of information (e.g. the reflectivity), the term "geological information" may be used. More specifically, the well data may comprise a large number of pieces of information which have been previously filtered/sorted/computed so as to only contain a single type of data (e.g. reflectivity, porosity, etc.): filtered well data are generally referred to as "geological information". However, the term well data will be used in its widest sense below to cover processed geological information also. Most of these pieces of information may be expressed in numeric form (e.g. the reflectivity expressed as a percentage, the permeability expressed in Darcy, the porosity expressed as a percentage, etc.).

The well data or geological information may comprise a piece of information from a group including a piece of porosity information, a piece of reflectivity information, a piece of density information, a piece of resistivity information and a piece of mineralogical composition information, a piece of gamma-ray log information, a piece of density information, a piece of sound propagation rate information, a piece of permeability information and a piece of saturation information. The second piece of geological information may be a piece of filtered information in a given frequency range. The given frequency range may be a single frequency. This filtering makes it possible to limit the amount of information for training the neural network.

By way of illustration, the curve 300 represents well data for a reservoir zone of the subsoil (relating to the rock reflectivity). The X-axis of this curve represents the depth of the well data item and the Y-axis represents the value thereof. These data are data containing "high-frequency" information.

Figure 3B:
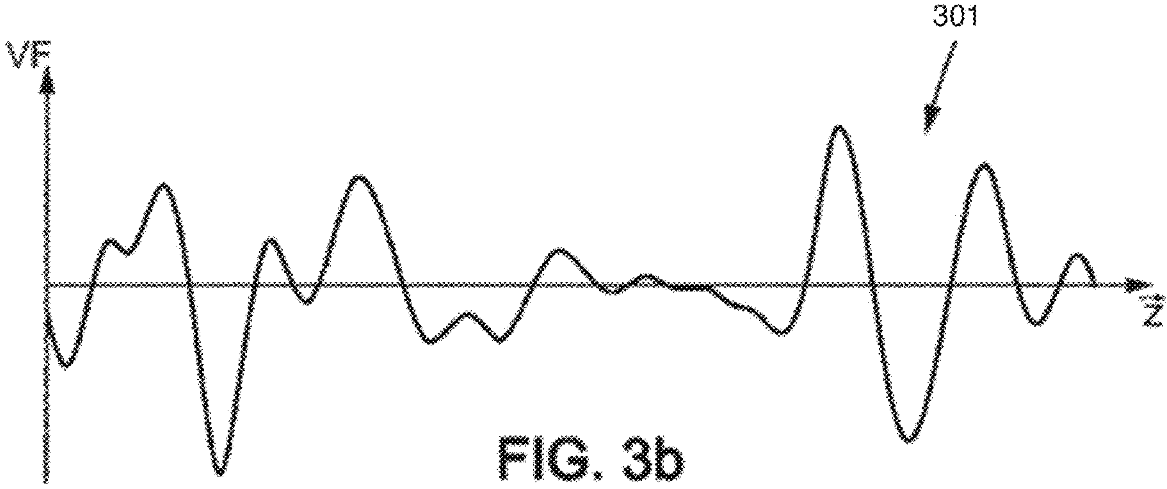
FIG. 3*b* illustrates an example of filtered well data in one embodiment according to the invention.

FIG. 3*b* illustrates an example of filtered well data. It is possible to process the raw well data received in order to obtain modified/processed data. For example, the processing may comprise a filter making it possible to only retain a fine frequency range (e.g. 90-100 Hz) or advantageously a broader frequency range (e.g. from 0 Hz to 200 Hz) including the value 0 Hz. The curve 301 represents the data derived from filtering the data of the curve 300 through a bandpass filter (e.g., having a frequency band of 10-50 Hz.

The aforementioned WO2015/067864 described an inversion method based on training a neural network and using this trained neural network to infer well data or geological information from seismic data (e.g., the trained network may be used as a seismic to well tie). The concepts disclosed therein are based on an assumption that the seismic wavelet is substantially constant (or subject to little variation) throughout the "reservoir" domain or zone (i.e. consisting of rock suitable for capturing gas or hydrocarbons). The use of the trained neural network makes it possible to ignore the seismic wavelet considered to be constant or invariant in the domain considered (i.e., a blind decomposition or deconvolution as the variation thereof is very small in this domain), as a neural network can be trained to deconvolve or remove such an invariant wavelet through training. The neural network can then use knowledge of a well (measured well log data) to enhance the resolution of the seismic acquisition in another domain of the subsoil ("generalisation").

It should be appreciated that any reference to removing the seismic wavelet by the trained neural network comprises removing only the remaining wavelet or residual wavelet which is not removed during standard seismic processing, as initial seismic processing will remove most of the wavelet.

The training of the neural network may comprise the following steps:

- receiving seismic data (e.g., pre-stack seismic data) comprising at least one seismic signal derived from the emission of a seismic wavelet in a subsoil;
- identifying at least one portion of each seismic signal corresponding to reflections of the seismic wavelet in a reservoir zone of said subsoil, and determining a length of the seismic wavelet (e.g., using the methods described above);
- receiving well data corresponding to said identified reservoir zone; and
- training a neural network using training data comprising: a plurality of sub-portions of the at least one portion as input variables, where the sub-portions each have a length dependent on the determined length of the seismic wavelet, and at least one second piece of geological information according to said well data as a target variable.

Figure 4A:
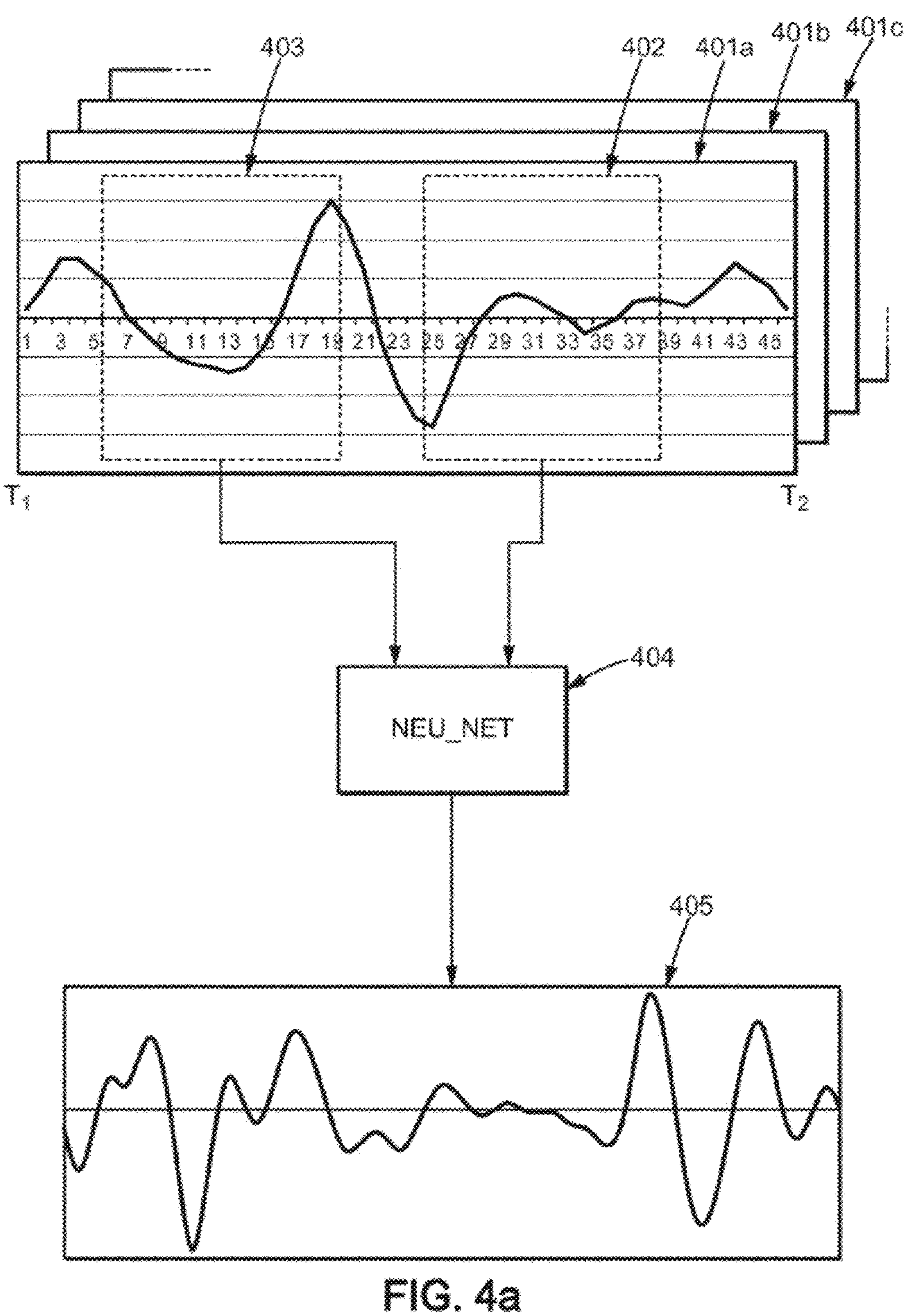
FIG. 4*a* illustrates training of a neural network based on seismic signal data and filtered well data in one embodiment according to the invention.

FIG. 4*a* illustrates this training of a neural network based on seismic signal data and filtered well data. In order to carry out training of a neural network 404 using a back propagation principle, it is useful to provide the neural network 404 with numerous examples of input values associated with one or a plurality of output values. These values are referred to as a "training set". This training is in fact "supervised" training as the correct output values (measured well data) are known for each input value (seismic data). During the training, the nodes of the neural network 404 are modified. Numerous algorithms are possible for such modifications (i.e. modification of weightings of the different nodes).

It is also possible to envisage a set of input and output values suitable for validating the neural network and/or computing the error of this network: this is referred to as the "validation set". In practice, the training set is frequently approximately two times greater than the validation set (e.g. in a 70%-30% ratio for example).

In the embodiment shown, it is possible to adopt a plurality of sub-portions (402, 403) of the pre-stack signal (401*a*, 401*b*, 401*c*, etc.) as input values. Obviously, if the signal is a stack signal, it is possible to work directly with this signal rather than with each of the pre-stack signals. Using pre-stack signals makes it possible to prevent of the loss of "high-frequency" information associated with the stacking of signals which are not perfectly "corrected" (e.g. "normal moveout correction"). The length of these sub-portions may be chosen to be the length of the wavelet determined previously, or slightly longer. For example, length of these sub-portions may comprise a multiple of the length of the wavelet determined previously. As such, the length of these sub-portions may be between 1 and 2 times the determined wavelet length (e.g., 1×, 1.1× or 1.5× or 2× the determined wavelet length) as the length of these sub-portions: If the sub-portion is slightly greater than the wavelet, the precision of the neural network can be greater, particularly in the event of poor evaluation of the length of the wavelet or in the event of poor well-seismic alignment, even though the convergence of the neural network during training may be slower. As such, the sub-portion length chosen may be a factor of the uncertainty on the wavelet length evaluation/or well-seismic alignment, with longer lengths chosen when uncertainty is greater.

It is possible to take a single output value for all the input values of the training set. This single output value is the processed/filtered signal 405 derived from the well data and limited to the "reservoir" domain. Training the neural network can make it possible to avoid computing complex de-convolutions as mentioned with reference to FIG. 2*a*. Furthermore, the neural network accounts for the entire signal received, including the "high-frequency" information previously considered as noise, to be removed from the computations.

The data returned by the neural network are of the same type as the well data used for training: e.g., if the well data used for training are pieces of reflectivity information, the neural network returns reflectivity information, etc.

Figure 4B:
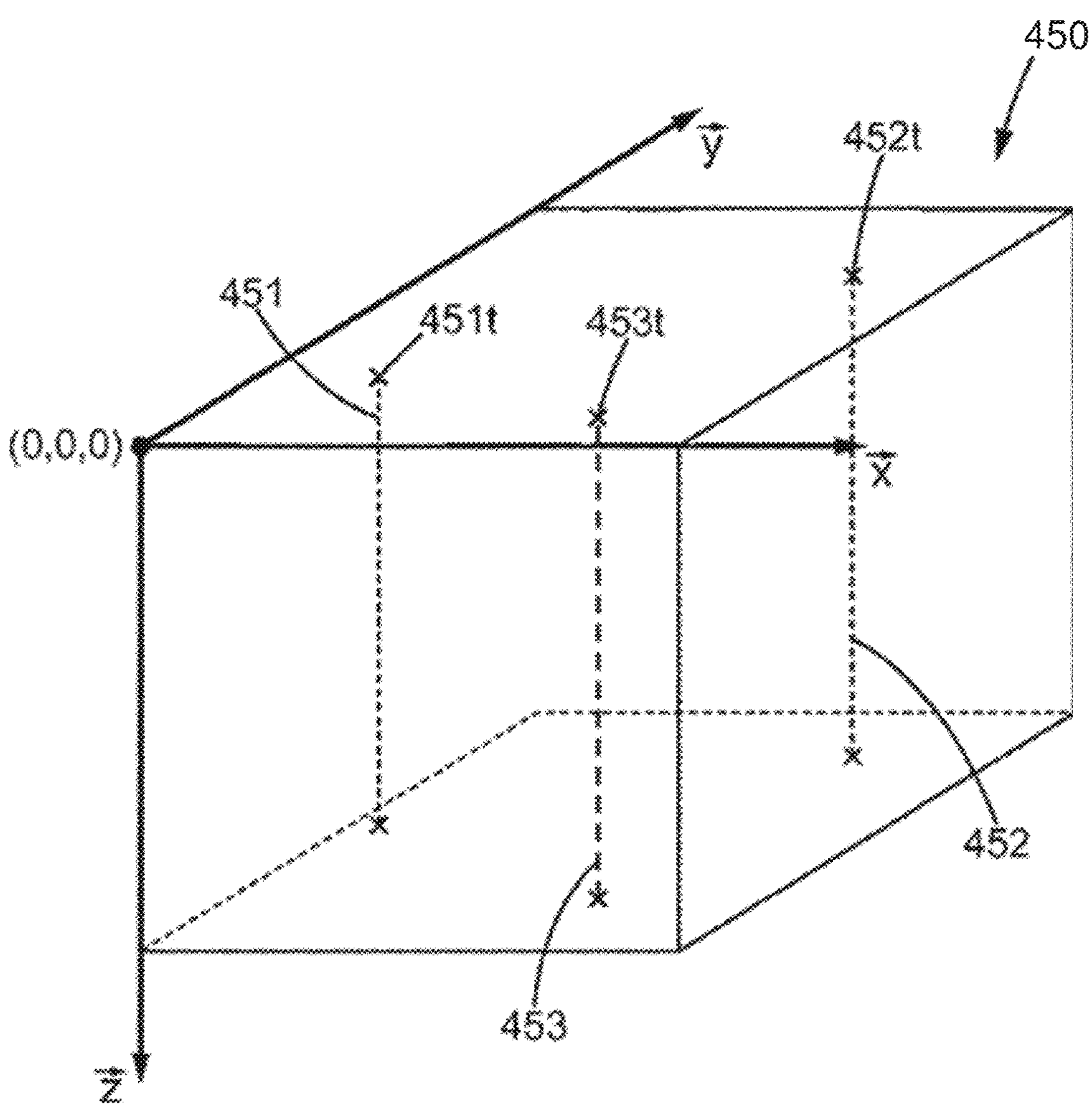
FIG. 4*b* illustrates a three-dimensional representation of a geological subsoil.

FIG. 4*b* illustrates a three-dimensional representation of a geological subsoil. In this representation 450, the well data on the wells 451 and 452 are known. It is thus possible to carry out training of the neural network 404 using, as input data, sub-portions of the pre-stack signal received at the wellhead 451 *t* and associated with the known well data on the well 451.

It is also possible to add to these input and output data, further data obtained from other wells such as the well 452. As such, the training may be carried out using as input data:

- sub-portions of the pre-stack signal received at the wellhead 451*t* and associated with the known well data on the well 451 (and optionally modified as described above); and
- sub-portions of the pre-stack signal received at the wellhead 452*t* and associated with the known well data on the well 452 (and optionally modified as described above).

Once the training of the neural network is complete, it is possible to have the neural network determine well data along a "virtual" well (i.e. vertical segment along $\vec{z}$ of the space $\vec{x}$, $\vec{y}$, $\vec{z}$) not actually drilled, e.g. segment 453) on the basis of the seismic signal received at the wellhead (e.g. point 453*t*) of this "virtual" well.

A main advantage of BNNI techniques disclosed in WO2015/067864 is that more of the seismic signal (e.g., including the high frequency information normally filtered out as noise) can be used in training the neural network and therefore can be used in inverting the seismic data using the trained neural network. While the seismic data may still be filtered to remove very high frequency content, BNNI techniques enable the retention of seismic data up to 2 to 3 times the frequency of the seismic wavelet, for example. This is a consequence of the assumption that the seismic wavelet is constant within the reservoir zone. Using seismic data including all high frequency information and an assumed constant wavelet to train the neural network will mean that the neural network will learn to deconvolve the wavelet (the learning will remove the constant component) when learning to map the seismic data to the well data. This high frequency information comprises useful reservoir information.

A main issue with the BNNI prior art disclosed within WO2015/067864 is that the relationship between the location of the well and the seismic data as recorded (i.e., seismic-to-well tie) is not known accurately. The location of a well is well-estimated. But seismic data comprises an indirect image (not reality), and the well location will depend on other factors e.g., processing factors.

The proposed concepts disclosed herein addresses this issue, for multiple well systems, so as to optimize well location within the seismic data for such multiple well systems. Improved well placement will improve a subsequent inversion result (e.g., using a trained network using BNNI techniques).

For a single well, mathematical techniques are known. However these methods are intensive and too slow for multiple well systems. Some Middle East systems, for example, may comprise hundreds of wells.

To highlight this issue of multiple well systems, consider a possible well location within a possible volume comprising (for example) 10×10×10 possible blocks around a possible location or initial estimate. This means that there will be 1000 possible locations per well. For a multiple well system comprising 100 wells, there will be $1000^{100}$ (i.e., $10^{300}$) possible solutions which is too many to consider by conventional methods.

The methods disclosed herein propose solving this multiple well location problem using an evolutionary algorithm machine learning method. The description will describe the concepts in terms of using a genetic algorithm (GA) method, although it should be appreciate that any suitable evolutionary algorithm may be used.

The method may use a trained neural network (e.g., using the BNNI methods described above), which can estimate well data from seismic data (e.g., perform a blind inversion). The (e.g., pre-stack) seismic data which was used to train the neural network may have comprised its high frequency content (e.g., this high frequency content was not filtered out). As such, any seismic data used in the steps described below may similarly comprise pre-stack data not filtered to remove high frequency content.

The method may further comprise an initial step of training such a neural network using (e.g., pre-stack) seismic data not filtered for high frequency content. Such training may use the methods described above and/or in WO2015/067864 based on the assumption of a constant wavelet which does not require characterization.

Within the training data used to train the neural network, seismic data from each location will be associated with well data corresponding substantially to the same respective location. However there will be an uncertainty associated with the well-seismic alignment. As such, if a seismic signal is received as a coordinate (x,y,z), then the well data are obtained from drill holes wherein the wellhead coordinates are x±Δx, y±Δy, z±Δz (or t±Δt) where Δx, Δy, Δz (conventionally z or t describes the depth direction perpendicular the surface plane defined by the x and y directions) are representative values of an uncertainty relating to the well-seismic alignment.

Therefore, the well location x0, y0, z0 for a particular well may be considered to be somewhere in a region of volume Δx*Δy*Δz around a position x,y,z associated with the corresponding seismic data. This well location may be considered in terms of probabilities within this region. The locations of some wells will be known with more certainty than others.

As has been described, this region of uncertainty may be defined in terms of a certain number of seismic blocks or units of a seismic cube (inversion result), although other units may be used. The number of blocks may be the same in each direction, or may differ depending on other geological factors. The specific example above defined each region of uncertainty as a respective 10×10×10 block cube for each well, although this may of course differ. The size of the region of uncertainty may be the same for all wells, or differ for at least some wells.

The proposed method applies GA techniques to a well system which comprises a plurality of wells (e.g., more than 20 wells, more than 50 wells, more than 80 wells or more than 100 wells), of which a proper subset are validation wells (e.g., calibrated wells with known position with respect to the seismic data). This proper subset may comprise, for example, fewer then 20, fewer than 10 or fewer than 5 wells (or fewer than 20%, fewer than 10% or fewer than 50% of the total number of wells. Any conventional or known method for single well placement may be used to calibrate the validation well such that their location is known with respect to the seismic data within the reservoir.

The GA will generate new (child) populations (e.g., sets of well positions) from parent populations and evaluate each new population. The evaluation may use the validation wells as a reference (e.g., this may comprise evaluating how well an inversion based on the latest population can predict the location of the validation wells). Any suitable comparison of the inverted seismic data based on the new population with the validation wells can be used. The inversion may be performed using the trained neural network. The same neural network may be applied to the seismic data corresponding to each well to perform the inversion.

For each new population (e.g., for every change in well position), a retraining step is performed to further train the neural network (e.g., using the same training seismic data and well data as had been used to originally train the network) according to the new population. Each time, this retraining may be performed over a fixed number of training iterations to avoid overfitting (e.g., between 200 and 5000, between 300 and 4000, between 500 and 3000, between 500 and 2000 or around 1000 iterations). Optionally, at the beginning of each training step, the neural network has been initialized the same such that it begins with the same initial weights, nodes and/or same settings.

Figure 5:
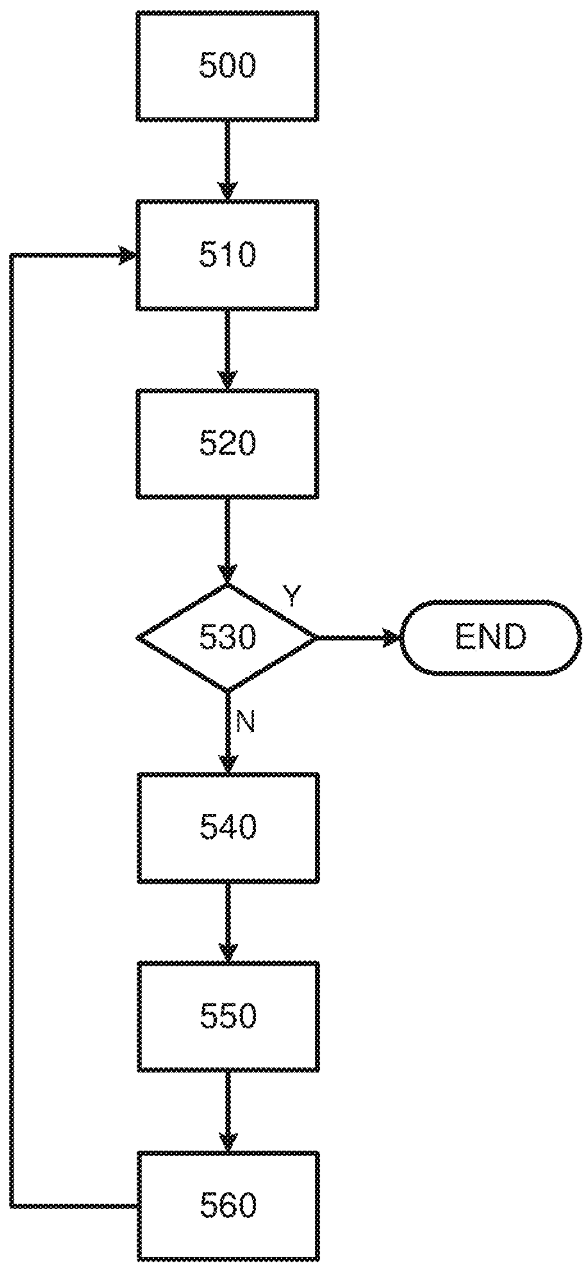
FIG. 5 is a flowchart describing an embodiment according to an embodiment.

It should be appreciated that this is not a complete retraining, but rather an additional retraining (or supplemental training) of the already trained network. This retrained network can then be used to provide an inversion result (seismic cube) for evaluation of the new population in another GA iteration. This method can be repeated till at least one stopping criterion is reached. FIG. 5 is a flowchart of a possible method according to an embodiment, which uses a GA to optimize well placement.

At step 500, an initialization step comprises generating a first population of well locations (e.g., an initial estimate or candidate set of well locations). The initial population may place each (undetermined) well at a location within a respective region of uncertainty Δx*Δy*Δz comprising a plurality of possible locations surrounding the initial estimate for each well. Validation wells can either be left out of the population or included with zero uncertainty (e.g., Δx, Δy, Δz all set to zero for these validation wells), such that they are not relocated from their known location.

At step 510, seismic data (e.g., comprising high frequency components) for each well is inverted in accordance with the existing population (which will be the first population in a first iteration). The inversion may be performed for each well using BNNI techniques; e.g., by applying a trained neural network to the seismic data corresponding to each well location as defined in the population. In an embodiment, the BNNI may provide an inverted cube such as a log property attribute cube (e.g., a porosity cube, gamma ray cube, etc.). It is proposed that the same trained neural network (i.e., with the same settings, coefficient weighs and number of nodes etc.) is used for inverting the seismic data for each well.

At step 520, the existing population may be evaluated by comparing the result of an inversion for each well with the known well data (e.g., well data for the validation wells). In this step, a suitable function may be computed to evaluate the comparison; e.g., the function may yield an error metric (e.g., the mid-square error) or correlation metric between the known well data and the inversion result for these validation wells. The approach may comprise a global comparison of the inverted data and known well data for the validation well(s). Alternatively or in addition, this step may determine a prediction of the location of the validation wells based on the inversion, which can then be compared to the known location. As such, the evaluation step may comprise determining how well the inversion result describes the known location of the validation wells.

At step 530, it is determined whether a stopping criterion is reached. This may comprise determining whether the error metric has surpassed a threshold value indicating convergence (e.g., a threshold error metric). An alternative stopping criteria may comprise stopping after a fixed number of iterations, or stopping after a fixed number of iterations provided a threshold error metric has been reached. The threshold error metric may be indicative of (e.g., quantifies) the quality of the population. If the stopping criterion is met the process stops, otherwise it continues to step 540. If the population is close to the actual solution, convergence will be quick.

At step 540, a portion of the existing population is selected to define "parents" to breed a new generation. Individual solutions may be selected through a fitness-based process, where fitter solutions (as measured by a fitness function) may be more likely to be selected. For example, a pair (or more) of "parent" solutions may be selected for breeding from the pool selected previously.

At step 550 a "child" solution (new generation) is produced using methods such as crossover and/or mutation, to obtain a new population (candidate set of well locations) which typically shares many of the characteristics of its "parents".

At step 560, a retraining step is performed to retrain the neural network with the wells located in accordance to the new population determined at step 550. The retraining may performed over a fixed number of training iterations to prevent overfitting.

Steps 510 to 560 are repeated iteratively till the stopping criterion is met. In each iteration, new parents are selected for each child generated in the previous iteration.

These processes ultimately result in each next generation population being different from the previous generation. Generally, the average fitness will have increased by this procedure for the population, since typically only the best "organisms" (solutions) from the first generation are selected for breeding, along with, possibly, a small proportion of less fit solutions. These less fit solutions may ensure genetic diversity within the genetic pool of the parents and therefore ensure the genetic diversity of the subsequent generation of children.

For evaluating the population (e.g., step 520), there should be known well data available for one or more of the wells, such that the location of these wells with respect to the seismic data is well known. The known well data may be obtained using a single well seismic-to-well tie method (e.g. using one of the known methods) on one or a more (e.g., fewer then 20, fewer than 10 or fewer than 5) wells to calibrate and/or verify each of these wells accurately. Alternatively, or in addition, other well test methods can be used to obtain the known well data or calibrated wells.

Therefore, in summary, a method is described to determine all well positions with respect to seismic data for a multiple well system which is driven by result—i.e., the inversion (e.g., as performed in step 610). What has been recorded at each well is well-estimated by the seismic data. The proposed method finds the best match between an estimation derived from seismic data based on a well population to that actually observed, for all wells. Validation wells or calibrated wells may be used as a reference, such that a comparison of the inversion result based on a well location population determines whether the inverted seismic data from the other wells is able to predict the (known) validation wells.

Figure 6:
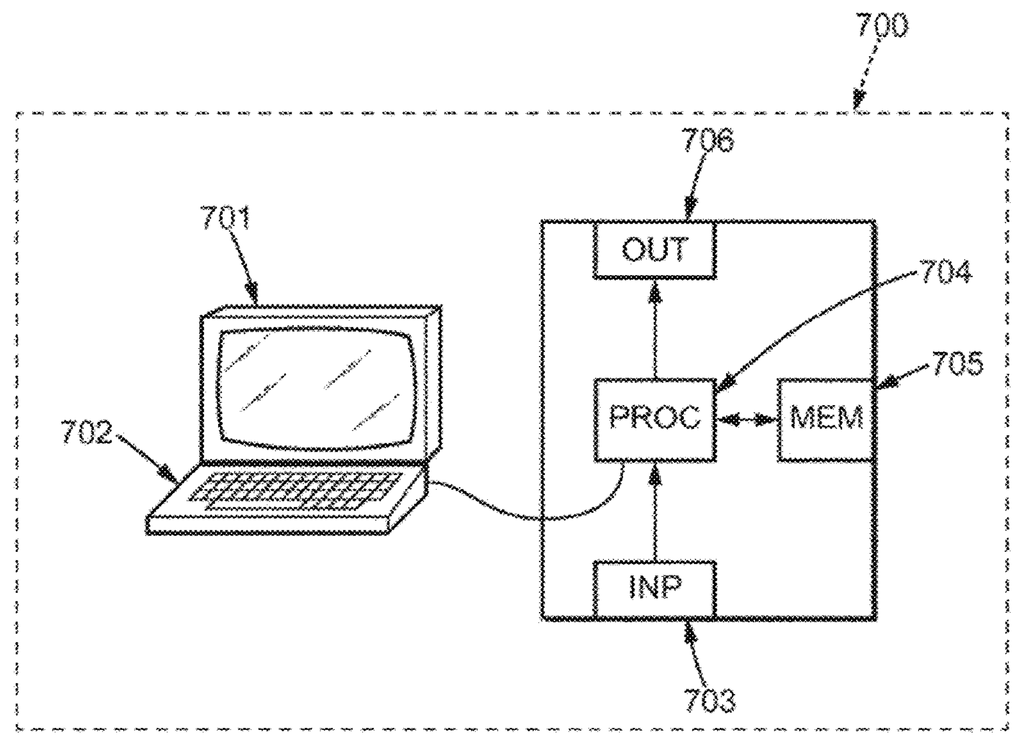
FIG. 6 is an example of a device suitable for implementing an embodiment of the invention.

FIG. 6 represents an example of a device for which may be used to perform the methods disclosed herein.

In this embodiment, the device includes a computer 700, comprising a memory 705 to store instructions for implementing the method, the measurement data received, and temporary data to carry out the various steps of the method as described above.

The computer further includes a circuit 704. This circuit can be, for example:

- a processor suitable for interpreting instructions in computer program format, or
- an electronic card wherein the steps of any of the methods disclosed herein are described in silicon, or
- a programmable electronic array such as an FPGA array (Field-Programmable Gate Array).

This computer includes an input interface 703 for receiving seismic data or well data, and an output interface 706 for supplying the well data at any spatial point. Finally, the computer can include, to enable easy interaction with a user, a screen 701 and a keyboard 702. Obviously, the keyboard is optional, notably in the case of a computer in the form of a tactile tablet, for example.

Obviously, the present invention is not limited to the embodiments described above by way of examples; it applies to further alternative embodiments.

Further embodiments are possible.

The methods disclosed herein may comprise optimizing a production strategy based on the corrected trajectories and/or trained network which has been trained using said corrected trajectories. Optimizing a production strategy may comprise selecting from and/or optimizing one or more of: different well placements, different number of wells, different injection fluid pressures, different injection strategies, different injection fluids and/or drilling used. Optimizing hydrocarbon recovery may comprise selecting one or more of said different production strategies which are determined to maximize hydrocarbon production and/or minimize production costs.

The concepts described herein find utility in all aspects of surveillance, monitoring, optimisation and prediction of hydrocarbon reservoir and well systems, and may aid in, and form part of, methods for extracting hydrocarbons from such hydrocarbon reservoir and well systems.

The well locations and/or the final trained neural network (e.g., as trained at step 560 in the final iteration), once determined, can be used to improve inversion of seismic data relating to the reservoir zone. As such, the method may further comprise performing inversion on seismic data based on the determined well locations, to obtain corresponding well data (i.e., to obtain data which characterises the well or other subsurface region in terms of one or more geological parameters). More specifically, the method may comprise performing a BNNI inversion using the final trained neural network on seismic data for the reservoir zone. The well data may be used to predict downhole conditions and make decisions concerning field operations. Such decisions may involve well planning, well targeting, well completions, operating levels, production rates and other operations and/or operating parameters.

One or more steps of the methods and concepts described herein may be embodied in the form of computer readable instructions for running on suitable computer apparatus, or in the form of a computer system comprising at least a storage means for storing program instructions embodying the concepts described herein and a processing unit for performing the instructions. As is conventional, the storage means may comprise a computer memory (of any sort), and/or disk drive, optical drive or similar. Such a computer system may also comprise a display unit and one or more input/output devices.

It should be appreciated that the above description is for illustration only and other embodiments and variations may be envisaged without departing from the spirit and scope of the invention.

The invention claimed is:

1. A method for determining a seismic-to-well tie for a plurality of wells comprised within a reservoir zone, the method comprising:

a) obtaining a trained neural network, having been trained to infer well data from seismic data for said reservoir zone;

b) generating a first candidate population of well locations for each of said plurality of wells;

c) using said trained neural network to invert seismic data relating to said reservoir zone in accordance with said candidate population of well locations, to obtain inversion well data;

d) evaluating said inversion well data by comparing said inversion well data to validation well data relating to the reservoir zone;

e) applying an evolutionary algorithm to said candidate population of well locations to obtain an updated candidate population of well locations;

f) further training said trained neural network in accordance with said updated candidate population of well locations; and g) iteratively repeating steps c) to f) until at least one stopping criterion is reached;

the method further comprising:

using the neural network trained at a final iteration to perform an inversion on further seismic data relating to said reservoir zone to obtain further well data relating to said reservoir zone; and optimizing a production strategy to produce hydrocarbon from said reservoir zone based on said further well data, the optimization of the production strategy comprising selecting from and/or optimizing one or more of different well placements, different number of wells, different injection fluid pressures, different injection strategies, or different injection fluids and/or drilling used.

2. A method as claimed in claim 1 wherein the same trained neural network is used to invert each well at step c).

3. A method as claimed in claim 1, wherein at step f), said further training is performed over a fixed number of training iterations.

4. A method as claimed in claim 1, wherein said seismic data comprises pre-stack seismic data.

5. A method as claimed in claim 1, wherein each of said plurality of wells has an associated region of uncertainty within which it may be located and said method comprises determining an improved estimation of the location of each well within its respective region of uncertainty.

6. A method as claimed in claim 1, wherein said evolutionary algorithm comprises a genetic algorithm and step e) comprises:

selecting two or more parent populations from within said candidate population; and generating a child solution using crossover and/or mutation, to obtain said updated candidate population.

7. A method as claimed in claim 1, wherein said validation well data relates to one or more validation wells also comprised within said reservoir zone, said validation wells having a known well location.

8. A method as claimed in claim 7, wherein step d) comprises determining an error metric describing a difference between said inversion well data with respect to said validation well data.

9. A method as claimed in claim 8, wherein step g) is performed until said error metric is below a threshold.

10. A method as claimed in claim 1, wherein step d) comprises determining a prediction of the location of each validation well based on the inversion well data, and comparing the predicted location with a respective known location for each validation well.

11. A method as claimed in claim 1, wherein said plurality of wells numbers 10 or more.

12. A method as claimed in claim 1, wherein said plurality of wells numbers 50 or more, or 100 or more.

13. A method as claimed in claim 1, wherein said seismic data comprises high frequency content up to 3 times the frequency of a seismic wavelet emitted in a subsoil to obtain said seismic data.

14. A method as claimed in claim 1, comprising an initial step of training said neural network based on training data relating to at least some of said plurality of wells.

15. A method as claimed in claim 14, wherein said step of training comprises:

receiving said seismic data comprising at least one seismic signal derived from the emission of a seismic wavelet in a subsoil;

identifying at least one portion of said at least one seismic signal corresponding to reflections of the seismic wavelet in the reservoir zone;

determining a length of the seismic wavelet;

receiving well data corresponding to said identified reservoir zone; and training the neural network using:

a plurality of sub-portions of said at least one portion as input variables, said sub-portions of the portion having a length dependent on the length of the seismic wavelet determined, and at least one piece of well data, or geological information corresponding to said well data, as a target variable.

16. A method as claimed in claim 15, wherein the at least one seismic signal comprises a plurality of pre-stack seismic signals.

17. A method as claimed in claim 15, wherein the wavelet length is determined according to an autocorrelation calculation of said at least one portion.

18. A method as claimed in claim 15 wherein the length of the sub-portions is between 1 and 2 times the length of the seismic wavelet determined.

19. A method as claimed in claim 1, wherein at step f), said further training begins with the neural network comprising the same initial weights, nodes, and/or settings.

20. A computer program stored on a non-transitory computer-readable medium comprising computer readable instructions which, when run on suitable computer apparatus, cause the computer apparatus to perform the method of claim 1.

21. A non-transitory computer program carrier comprising the computer program of claim 20.

22. A processing apparatus comprising:

a processor; and the non-transitory computer program carrier of claim 21.

23. A method as claim in claim 1, wherein the optimization of the production strategy is performed to maximize hydrocarbon production and/or minimize production costs.

24. A method as claimed in claim 1, further performing hydrocarbon recovery by following the production strategy.

* * * * *